Jan. 21, 1964   R. BECKADOLPH   3,118,483
PNEUMATIC VEHICLE TIRE
Filed Aug. 30, 1961
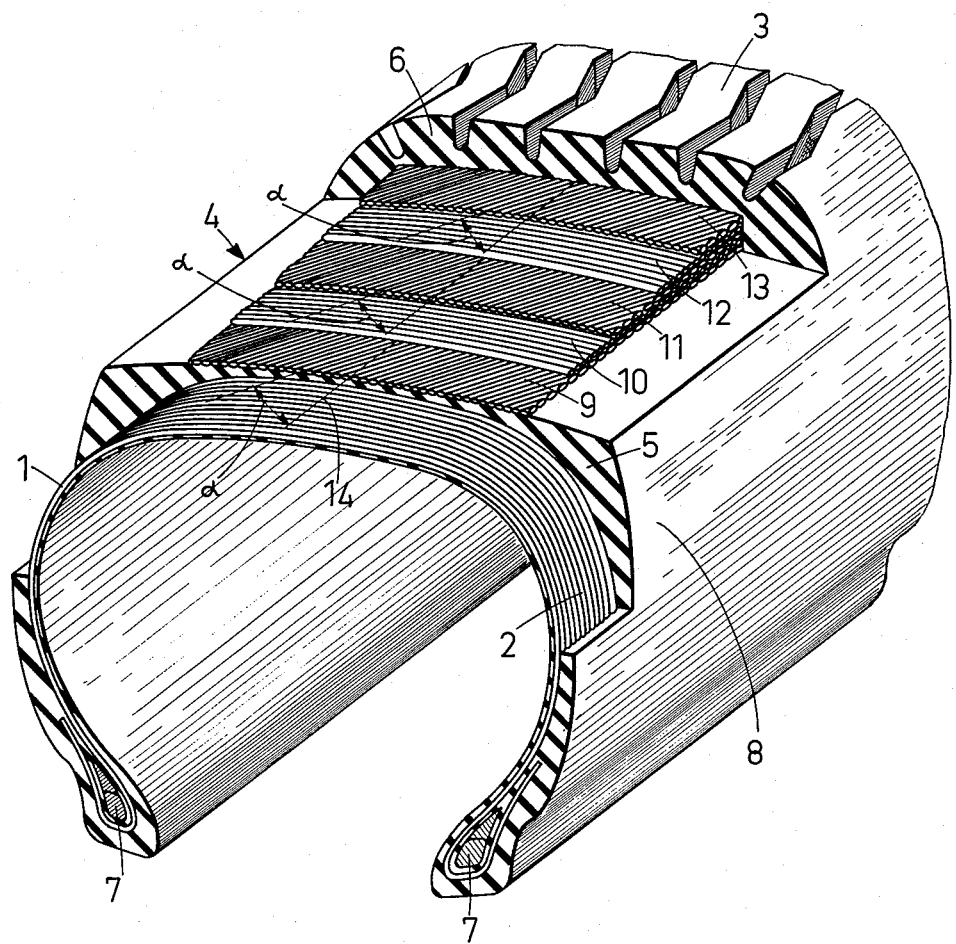
INVENTOR
BY
his ATTORNEY

United States Patent Office 3,118,483
Patented Jan. 21, 1964

3,118,483
PNEUMATIC VEHICLE TIRE
Richard Beckadolph, Hannover, Germany, assignor to Continental Gummi-Werke Aktiengesellschaft, Hannover, Germany
Filed Aug. 30, 1961, Ser. No. 134,974
Claims priority, application Germany Aug. 31, 1960
4 Claims. (Cl. 152—361)

The present invention relates to a pneumatic vehicle tire with a carcass the threads, cords or the like of which are located in practically radial planes with regard to the tire, and which is provided with a pull resistant reinforcing insert extending substantially over the width of the tread surface and located between the latter and the carcass. The said pull resistant reinforcing insert is formed of three or more layers of parellel threads, cords or the like in such a way that the threads, cords or the like of one layer cross the threads, cords or the like of another layer.

It is an object of this invention to provide a pneumatic vehicle tire of the above mentioned general character, which will excel in a high dynamic softness and wear resistance and stiffness in transverse direction.

It is a further object of this invention to provide a pneumatic vehicle tire as set forth in the preceding paragraph, in which undesired deformations of the tread strip at the ground contacting portion will be prevented.

These and other objects and advantages of the invention will appear more clearly from the following specification in connection with the accompanying drawing illustrating in perspective, partially in section, a portion of a pneumatic vehicle tire according to the present invention.

A tire according to the present invention is characterized primarily by a combination of the following features:

(a) The reinforcing insert comprises two or more layers which extend at an acute angle, preferably at an angle of from 10 to 20°, especially at an angle of 15°, relative to the circumferential direction of the tire.

(b) Between the said layers with the threads or the like extending at an acute angle, there is preferably arranged a layer of threads or the like which extends in the direction corresponding to that of the threads or the like of the carcass.

(c) The threads or the like extending at an acute angle and pertaining to the various layers of the reinforcing insert extend all in an inclined direction.

More specifically, with regard to the drawing, the tire comprises in a manner known per se a carcass 1 which is formed by steel wires or steel cords 2 located in radial planes with regard to the tire. The tire furthermore comprises an annular substantially hollow cylindrical reinforcing insert 4 extending substantially over the width of the tread surface 3 of the tire and located between the latter and the carcass 1. In addition thereto, the tire comprises rubber layers 5, a tread strip 6 and bead cores 7 around which the steel cords 2 are passed and anchored. Preferably, the carcass 1 has one layer only so that in the tire side wall 8 there will be located merely one layer of substantially parallel steel cords 2 arranged in cord position whereby highly flexible side walls will be obtained.

The reinforcing insert 4 is in conformity with the embodiment shown by way of example in the drawing formed by five closely superimposed layers 9, 10, 11, 12 and 13 of cord threads arranged parallel to each other. The cord threads of layers 9, 11 and 13 are so located that they all extend in one inclined direction with regard to the circumferential direction of the tire. In addition thereto, also the cord threads of these layers all form a certain angle with the circumferential direction 14 of the tire, namely the angle $a$. In contrast thereto, the individual layers 10 and 12 interposed between the layers 9, 11 and 13 are formed by cord threads or the like which are parallel to the steel cords 2 of carcass 1. In this connection it should be noted that the cord threads of the layers 9, 11 and 13 may all or individually be embedded in relatively hard stiff rubber compounds. It is also possible to employ a softer rubber quality for the last mentioned cord threads when the cord threads of layers 10 and 12 are embedded in harder rubber compounds.

As mentioned above, in connection with the tire according to the present invention it is important that when viewing the total of the tire reinforcing cord threads, cables or the like of carcass 1 and reinforcing insert 4, the tire is reinforced by inserts which extend merely in two directions relative to the tire circumference.

While the reinforcing insert 4 of the tire in conformity with the particular embodiment shown in the drawing consists of five layers 9 to 13, it is, of course, possible for other or special cases of employment, for instance with less loaded tires, to reduce the number of layers whereas with heavy duty tires an increase in the number of layers of the reinforcing insert 4 may be effected. Thus, for instance the layers 12 and 13 may be omitted so that the reinforcing insert 4 would be composed of the layers 9, 10 and 11. When reducing the number of layers or increasing the same, it is, however, necessary to see to it that one layer with transversely directed cord threads or the like will be arranged between two layers with inclined cord threads and slightly spaced therefrom.

A pneumatic vehicle tire designed in conformity with the above description has a high dynamic softness and transverse resistance while being characterized by high wear resistance. Furthermore, the tire will during its formation in the vulcanizing mold be deformable to a sufficient extent. It is also important, particularly with regard to an economical and efficient manufacture, that the threads or the like forming the carcass and the annular reinforcing insert extend merely in two directions. In addition thereto, the tire according to the present invention is highly satisfactory in operation because the threads of the reinforcing insert which extend in the direction of the carcass thread or the like will have a favorable effect upon the performance of the tire at the ground contacting portion. Relative movements of the tread strip at the ground contacting portion will be prevented because the threads which extend in transverse direction or in the direction of the carcass threads or the like will prevent a transverse contraction of the tread strip. It is furthermore advantageous, as set forth above, to arrange its threads or the like of the reinforcing insert which extend in the direction of the carcass threads or the like between those threads or the like of the reinforcing insert which preferably extend at an angle of 15°. The transverse threads are so to speak interboxed with the inclined threads. Undesired upset deformations cannot occur in view of the other threads or the like of the reinforcing insert which are located above and below said interboxed threads and are under a pre-pulling tension.

It is, of course, to be understood that the present invention is, by no means, limited to the particular construction shown in the drawing but also comprises any modifications within the scope of the appended claims. The term "thread means" as used in the claims also includes threads, cords and wires.

What I claim is:

1. A pneumatic vehicle tire with a tread strip, which includes: a carcass having thread means all of which are located in substantially radial planes of the tire, an annular reinforcing insert extending over substantially the width of said tread strip and being interposed between the latter and said carcass, said reinforcing insert comprising a plurality of first reinforcing insert layers of parallel thread means, said thread means of said first reinforcing insert layers forming an acute angle with the circumferential direction of said tire while extending in substantially the same angular direction with regard to the circumferential direction of the tire, and second reinforcing insert layers respectively interposed between each two adjacent ones of said first reinforcing insert layers and having thread means extending in a direction corresponding to the direction in which the thread means of said carcass extend, all of said insert layers being located above the thread means of said carcass.

2. A pneumatic vehicle tire according to claim 1, in which said acute angle formed by the thread means of said first reinforcing insert layers with the circumferential direction of the tire ranges from approximately 10 to 20°.

3. A pneumatic vehicle tire according to claim 1, in which said acute angle formed by the thread means of said first reinforcing insert layers with the circumferential direction of the tire is approximately 15°.

4. A pneumatic vehicle tire according to claim 1, in which the thread means of said first reinforcing insert layers all form an angle of the same magnitude with the circumferential direction of the tire.

References Cited in the file of this patent

UNITED STATES PATENTS

| 2,930,425 | Lugli et al. | Mar. 29, 1960 |
| 2,976,905 | Beckadolph | Mar. 28, 1961 |
| 2,984,282 | Vittorelli | May 16, 1961 |

FOREIGN PATENTS

| 1,187,756 | France | Mar. 9, 1959 |